(12) United States Patent
Stewart

(10) Patent No.: US 6,452,498 B2
(45) Date of Patent: Sep. 17, 2002

(54) SYSTEM AND METHOD FOR PROVIDING GEOGRAPHIC-BASED ADVERTISING

(75) Inventor: Brett B. Stewart, Austin, TX (US)

(73) Assignee: Wayport, Inc., Austin, TX (US)

(*) Notice: Subject to any disclaimer, the term of this patent is extended or adjusted under 35 U.S.C. 154(b) by 0 days.

(21) Appl. No.: 09/851,677

(22) Filed: May 8, 2001

Related U.S. Application Data

(62) Division of application No. 09/382,551, filed on Aug. 25, 1999, now Pat. No. 6,326,918, which is a continuation of application No. 09/186,131, filed on Nov. 4, 1998, now Pat. No. 5,969,678, which is a continuation of application No. 08/470,004, filed on Jun. 6, 1995, now Pat. No. 5,835,061.

(51) Int. Cl.[7] .............................................. G08B 23/00
(52) U.S. Cl. ............... 340/573.1; 235/375; 340/825.49; 705/26
(58) Field of Search ............................. 340/573.1, 572, 340/1, 568.5, 686.1, 825.49, 5.8; 235/375; 705/26, 27

(56) References Cited

U.S. PATENT DOCUMENTS

| | | | |
|---|---|---|---|
| 4,536,647 A | 8/1985 | Atalla et al. .................. 705/70 |
| 4,973,952 A | * 11/1990 | Malec et al. ......... 340/825.49 X |
| 5,095,532 A | 3/1992 | Mardus |
| 5,122,795 A | 6/1992 | Cubley et al. ............. 340/7.25 |
| 5,185,857 A | 2/1993 | Rozmanith et al. |
| 5,243,652 A | 9/1993 | Teare et al. |
| 5,264,822 A | * 11/1993 | Vogelman et al. ...... 340/692 X |
| 5,432,841 A | 7/1995 | Rimer |
| 5,559,520 A | 9/1996 | Barzegar et al. |
| 5,602,843 A | 2/1997 | Gray .......................... 370/338 |
| 5,636,245 A | 6/1997 | Ernst et al. |
| 5,646,632 A | 7/1997 | Khan et al. |
| 5,714,948 A | 2/1998 | Farmakis et al. ........... 340/961 |
| 5,835,061 A | 11/1998 | Stewart |
| 5,969,678 A | 10/1999 | Stewart |
| 5,995,015 A | * 11/1999 | DeTemple et al. ..... 340/825.49 |
| 6,202,054 B1 | 3/2001 | Lawlor et al. ................ 705/42 |
| 6,236,360 B1 | 5/2001 | Rudow et al. ......... 342/357.13 |
| 6,236,940 B1 | 5/2001 | Rudow et al. .............. 701/300 |

OTHER PUBLICATIONS

Bill N. Schilit and Marvin M. Theimer, Disseminating Active Map Information Mobile Hosts, IEEE Network, Sep./Oct. 1994.

Andy Harter and Andy Hopper, A Distributed Location System for the Active Office, IEEE Network, Jan./Feb. 1994.

Max J. Egenhofer, Spatial SQL: A Query and Presentation Language, IEEE Network, Feb. 1994.

Mike Spreitzer and Marvin Theimer, Providing Location Information in a Ubiquitous Computing Environment, Proceedings of the Fourteenth ACM Symposium on Operating Systems Principles, Dec. 1993.

George W. Fitzmaurice, Situated Information Spaces and Spatially Aware Palmtop Computers, Communication of the ACM, Jul. 1993.

(List continued on next page.)

Primary Examiner—Thomas Mullen
(74) Attorney, Agent, or Firm—Conley, Rose & Tayon PC; Jeffrey C. Hood

(57) ABSTRACT

A geographic-based communications service system has a mobile unit for transmitting/receiving information, and access points connected to a network. The access points are arranged in known geographic locations and transmit and receive information from the mobile unit. When one of the access points detects the presence of the mobile unit, it sends a signal to the network indicating the location of the mobile unit and the information requested by the mobile unit. Based on the signal received from the access point, the network communicates with information providers connected to the network and provides data to the mobile unit through the access point corresponding to the location of the mobile unit.

108 Claims, 2 Drawing Sheets

OTHER PUBLICATIONS

Ronald Azuma, Tracking Requirements for Augmented Reality, Communications of the ACM, vol. 36. No. 7, Jul. 1993.

Roy Want et al., The Active Badge Location System, ACM Transactions on Information Systems, vol. 10, No. 1, Jan. 1992.

Marvin White, Emerging Requirements for Digital Maps for In–Vehicle Pathfinding and Other Traveller Assistance, Vehicular Navigation & Information Systems Conference Proceedings, Part I, Oct. 1991.

Fred Phail, The Power of a Personal Computer for Car Information and Communications Systems, Vehicular Navigation & Information Systems Conference Proceedings, Part I, Oct. 1991.

Thomas A Dingus et al., Human Factors Engineering the TravTek Driver Interface, Vehicular Navigation & Information Systems Conference Proceedings, Part II, Oct 1991.

Michel Muffat et al., European Cooperation on Dual Mode Route Guidance Perspectives for Advanced Research Partners, Vehicular Navigation & Information Systems Conference Proceedings, Part II, Oct. 1991.

* cited by examiner

SYSTEM AND METHOD FOR PROVIDING GEOGRAPHIC-BASED ADVERTISING

This application is a divisional of application Ser. No. 09/382,551, filed Aug. 25, 1999, titled "Method and Apparatus for Geographic-Based Communications Service", now U.S. Pat. No. 6,326,918, which is a continuation of application Ser. No. 09/186,131, filed Nov. 4, 1998, titled "System for Hybrid Wired and Wireless Geographic-Based Communications Service, now U.S. Pat. No. 5,969,678 which is a continuation of application Ser. No. 08/470,004, filed Jun. 6, 1995, titled "Method and Apparatus for Geographic-Based Communications Service" which is now U.S. Pat. No. 5,835,061.

BACKGROUND OF THE INVENTION

1. Field of the Invention

The invention generally relates to a geographic-based communications service and, more particularly, is concerned with an apparatus and method for using known locations of wireless local area network access points (APs) to service mobile users (MUs) of portable smart devices (e.g., notebooks, personal computers, PDAs, etc.) who are in the vicinity of these APs.

2. Related Art

As technology improvements result in smaller, lighter and more portable computing devices, a wide variety of new applications and users will emerge. Users will not only operate such devices in stand alone mode, but with portability, users will also require the ability to send and receive information through such devices at any location. The need to communicate will arise in circumstances where hard wired links may not be readily available or practical or when the user of the portable computing device cannot be reached immediately. Moreover, a result of user mobility is that the precise location of the user is often variable or not determined. Conventional communications systems for computing devices are not equipped to handle such communication scenarios.

Commercially available personal computers or other similar devices are generally equipped with industry standard interface ports for driving a peripheral device such as a printer, a plotter, or a modem. While operating in an unknown, remote location not connected to a network, the portable personal computer user may be unaware of messages waiting for him. In addition, conventionally, the user must wait until reaching an office or other place with appropriate equipment to receive such messages and to transmit or print documents or other information prepared by the user on his personal device.

By way of example and not limitation, one type of mobile user is the traveler who passes through airports or similar mass transit centers (e.g., subway commuters), uses ground transportation and stays in a hotel. In a typical scenario, a traveler may use a personal computer to perform calculations or prepare documents on a personal computing device during an airplane flight. Simultaneously, associates may leave messages for the traveler on a network. In conventional systems, the user's work product and messages destined for the user are not available until the user arrives at a location where a wired connection to the user's network is available.

A further example of inefficiencies for the traveller concerns travel arrangements themselves. After arriving at an airport, the traveller proceeds to a car rental desk or to some other transportation location. The traveller typically waits in line while the car rental agency inquires about automobile preference, driver's license, method of payment, type of insurance required, etc. Having experienced some delay, the traveller is now on his way to a business location or hotel. Upon arriving at a hotel check-in/registration desk, the traveller often experiences further delay waiting in line and providing the check-in clerk with routine information such as address, length of stay, type of room desired, method of payment, etc. In addition, the business traveller must call back to his office to check for telephone messages, thereby incurring further delays.

While accessing data bases for information about the traveller, his preferences and requirements can reduce such delays, a common characteristic is that the pending arrival or presence of the traveller is not known to those who can act in advance. Further, conventional systems cannot generally locate a mobile user of a personal computing device and take advantage of that information to reduce the time required to complete routine activities or to provide the user options that can enhance the user's productivity.

In another example, when a user dials a telephone number to an automatic teller machine (ATM) locator, the user is prompted to key in his area code and exchange prefix. The locator system then identifies one or more ATMs within the user's area. However, the system requires the user to call in and cannot locate the user any more accurately than the telephone exchange area. Thus, the user could be advised of an ATM quite a physical distance from the user's location.

SUMMARY OF THE INVENTION

In view of the above limitations of the related art an object of the invention is to provide a system in which a mobile user can be geographically located automatically.

It is another object of the invention to provide a system which can automatically locate a user with greater precision than is currently available.

A still further object of the invention is to provide a system which integrates personal computing devices to networks such that routine tasks, such as travel routing can be accomplished more efficiently.

A still further object of the invention is to provide a system that allows a user to employ a personal computing device more effectively and to utilize otherwise idle time, such as time spent waiting at a car rental desk, a hotel registration desk and the like.

According to the invention, mobile users communicate with wireless local area networks within the range of an access point (AP). When a user passes an access point, the access point recognizes the user, and the user's device can then retrieve data (telephone, E-mail messages, etc.) waiting for the user and transmit information (E-mail messages, print documents, requests for information from service providers, etc.) that the user may have for transmission to a desired recipient. For instance, this process could occur as a user exits an airplane and is detected by an access point in an airport.

Accordingly, the present invention is directed toward a method and apparatus for using known locations of local area network APs (access points) to service mobile users who are in the vicinity of these APs. Such access points and mobile units typically communicate with each other in a wireless manner. The method according to the invention includes the steps of: (a) detecting the presence of a mobile unit in the vicinity of an access point and (b) transmitting/receiving information from the mobile unit to/from the network through the access point.

According to the invention, information and services can be provided by various providers connected to the network which are able to respond to unanticipated requests or which have acquired knowledge about the user's requirements, preferences and habits over a period of time and have extrapolated information from the user's past practices for probable future actions consistent with these past actions.

For example, in one application, an access point receives a print job from a user's mobile unit and sends it to a printer available at a destination point designated by the user so that the document is printed and available to the user upon his arrival at his destination. In another application according to the invention, upon detecting the arrival of a user's mobile unit at a destination, a message, for example, an E-mail message, is sent to the user's rental car agency. The agency can take appropriate actions so that the user's rental car is ready and the user does not waste time waiting in line. Using a similar approach, a user can be pre-registered at a hotel so that his room is ready upon arrival.

Thus, according to the invention, a geographic-based communications service system for mobile users includes a mobile unit for transmitting and receiving information and a plurality of access points connected to a network and arranged at known locations in a geographic region for transmitting the information to and receiving the information from said mobile unit. One of the access points detects the presence of a mobile unit and sends a signal to the network. A plurality of information providers are connected to the network. The network accesses the information providers based on the signal received from a mobile unit via the access points to provide data to the mobile unit or to another entity on behalf of the user of the mobile unit. In particular, the known location of the access point detecting the presence of the mobile unit defines the location of said mobile unit. Based on the location of the mobile unit as detected by the AP, a service provider on the network can take actions appropriate to the user's location, such as notifying a car rental agency of the user's presence or notifying the user of canceled flights and adjustments to the user's itinerary. Further according to the invention, clocks in the user's mobile device and event schedules can be updated automatically to correspond to the present time in the time zone where the access point detecting the user's mobile unit is located.

DETAILED DESCRIPTION OF THE PREFERRED EMBODIMENTS

Figure 1:
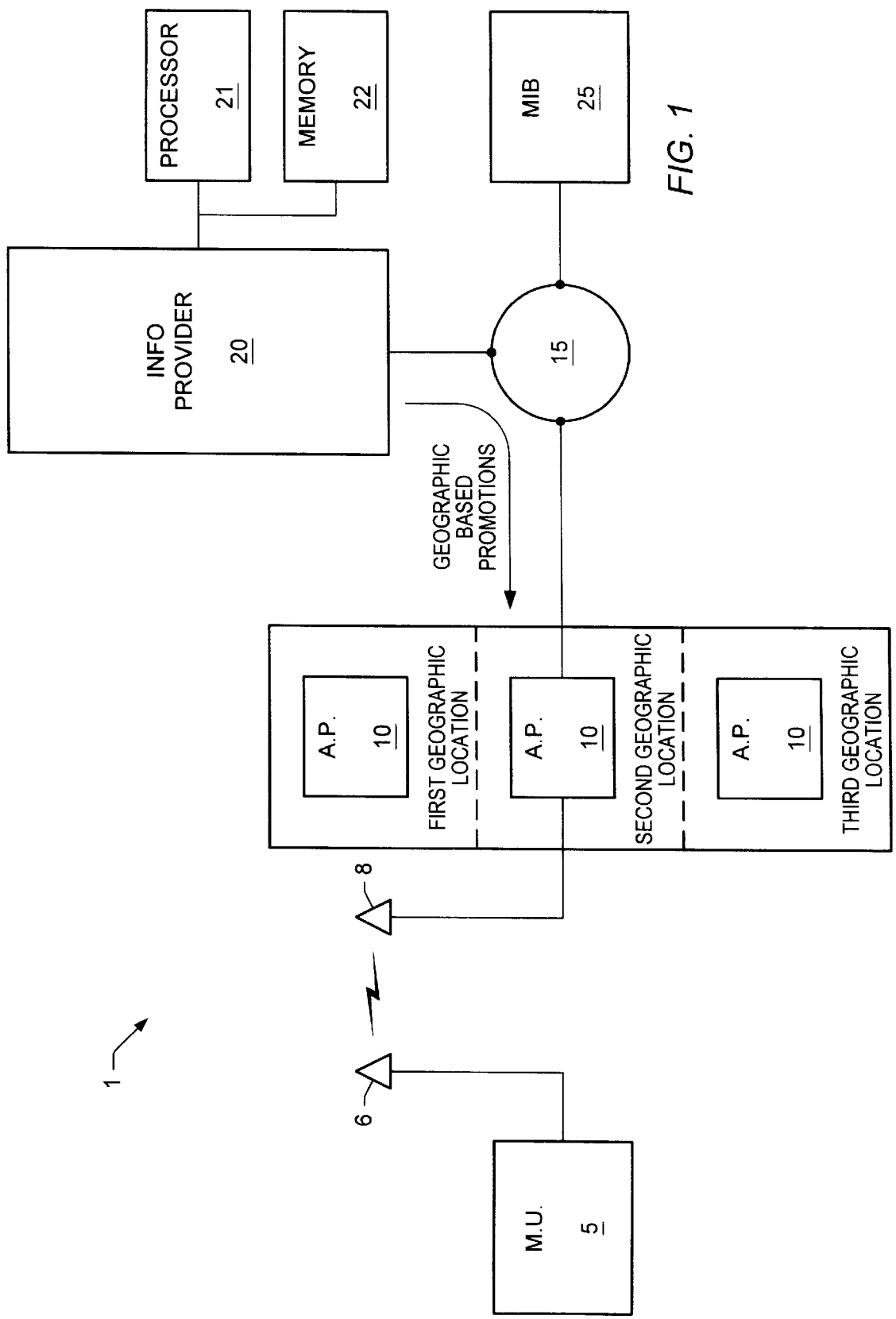
FIG. 1 is a representation of the geographic-based communications service system, according to the invention.

FIG. 1 shows a geographic-based communications service system, generally designated 1, according to the invention. The system includes a mobile unit (e.g., portable computer) 5, a plurality of APs (access points) 10, an information provider 20, a management information base (MIB) 25 and a centralized network 15. The APs 10 are located in a plurality of locations within a geographic region. The information provider 20 will typically have a processor 21 and memory 22 with controlled access thereto. Typically, access point 10 and mobile unit 5 communicate in a wireless manner. Thus, mobile unit 5 and access point 10 would be equipped with an appropriate transmitter and receiver compatible in power and frequency range to establish such a wireless communication link. In addition, mobile unit 5 would also be equipped with a code generator which generates an identification code that can be transmitted to and recognized by the access point 10 or a system accessed through access point 10. Such an identification code allows recognition of a user before providing access to system services, thereby providing a measure of security and a service billing mechanism.

Figure 2:
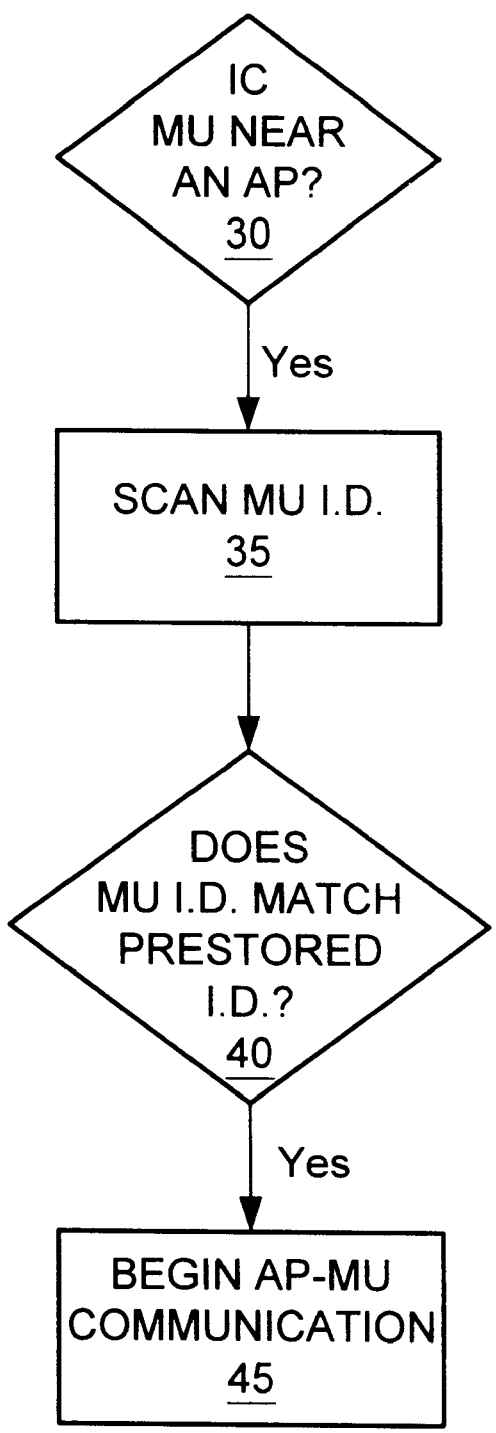
FIG. 2 is a flow chart showing a mobile unit interfacing with an access point, according to the system of FIG. 1.

FIG. 2 is a flow chart showing an implementation of the communication between the mobile unit 5 and an access point 10. In step 30, the access point 10 determines whether the mobile unit 5 is within the range of the access point 10. In steps 35 and 40, the access point 10 scans the mobile unit 5 and determines whether the mobile unit I.D. (identity) matches a prestored I.D., and in step 45, the communication between the mobile unit 5 and the access point 10 begins. The communication between mobile unit 5 and access point 10 may include sending and receiving information which may include text, voice data and video data.

As illustrated in FIG. 2 a first step according to the invention is establishing a connection between a mobile unit and an access point. Referring again to FIG. 1, the mobile unit 5 can send a beacon signal that is picked up by one of the APs 10 located in a plurality of locations within a geographic region. When the beacon signal is picked up by a particular AP 10, the beacon signal is transmitted back to the management information base (MIB) 25 by AP 10. Since the location of the access point is defined and known by MIB 25, detection of the presence of the mobile unit by an AP 10 allows MIB 25 to know exactly where the mobile user is located at any given time. For example, the MIB could store the latitude, longitude, altitude, and other geographic information such as a local map of the area of each access point.

The precision available in this type of mapping scheme is distinguished from that typically achieved in a cellular telephone system. In a cellular telephone system a user transmits a beacon signal at a fixed frequency. When the user moves from a first "cell" to a second "cell", the receiver located at the midpoint of the first cell no longer picks up the beacon signal, and the receiver located at the midpoint of the second cell picks up the beacon signal. A cellular telephone "handoff" in which the phone call is now under control of the second cell then takes place. It is only possible to locate the user to a relatively large area defined by the cells. There is no provision for locating the user more precisely within the cell. Thus, a cellular system is limited in its ability to provide services requiring the precise location of the user.

In the present invention, it is only necessary to provide the mobile unit a method of determining its own location. It is not necessary to provide tracking of the mobile unit's whereabouts. For example, upon establishing a connection with an AP 10, the mobile unit 5 can transmit a message inquiring "Where is this AP?" Upon receiving the answer that the AP 10 is located at the user's destination airport, the mobile unit can then transmit an E-mail to a car rental agency or hotel to AP 10. AP 10 routes the message through a network connected to AP 10 so that the user's car or hotel room is ready upon his arrival. Once the message is provided to the AP, it is not necessary to continue to track the user.

In another approach according to the invention, one or more selected APs 10 can be programmed to watch for the arrival of a particular mobile unit (target mobile unit). Upon detecting the presence of the target mobile unit, the AP 10 establishing the link with the target mobile unit sends a message directly to the rental car agency, hotel, etc. Since the message has been sent, other APs can then be directed to cease watching for the target mobile unit.

Another feature according to the invention allows the user to access a service provider over a network connected through the access point. For example, upon establishing its location, a mobile unit can direct an inquiry through the AP over the network connected to the user's bank to locate the nearest ATM. Since the user's location is established with relative precision by the location of the AP, the service provider can respond with a message such as "Straight ahead to exit 3, turn right and proceed two blocks." The message is routed to the user through the same AP.

According to the invention, service can be initiated by the mobile unit's transmission of an inquiry requiring a response. Alternatively, service can be initiated by an element of the network, such as a service provider, when an AP 10 detects the presence of a mobile unit. As an element of the network, the AP 10 could access its memory to initiate the service or transmit a message over the network to a service provider who initiates the appropriate service.

A system according to the invention would include a plurality of APs and mobile units and could be configured to allow all users access to all service providers on a network or to allow selected users access to selected service providers, depending on a service profile contracted for by the user. For example, according to the invention, system software could be programmed to provide service gates in which a user identification code is compared with a list of authorized codes for access to the particular service. In addition, users could contract for unlimited access for a fixed fee or for time billed access or some combination thereof. Service usage records for billing and other purposes can be maintained in an automated database, so that users can be billed by a single entity that maintains the network of APs or individually by each service provider.

Assume, for example, that a user of the mobile unit 5 is located at an airport and that several APs 10 are located at the same airport. The mobile unit 5 is connected to an antenna 6, and the AP 10 is connected to an antenna 8 which can both receive and transmit radio frequency (RF) signals at designated transmit and receive frequency bands. RF signals over-the-air from AP 10 are received by the antenna 6, and sent to mobile unit 5.

The mobile unit 5 can send information to the AP 10, for example, in order to retrieve messages or obtain information needed by the user or to send messages and data to other users. These messages are entered by the user through the mobile unit 5 or can be automatically generated, as in the previously described case of sending a message to a car rental company signalling the user's arrival at the airport. During this process, antenna 6 transmits the RF signal which is received by antenna 8 and sent to AP 10.

In one embodiment, when a beacon signal output from the mobile unit 5 is detected and received by AP 10, information in the beacon signal identifying the mobile unit is transmitted back to network 15. The information sent back to network 15 includes the identification number of the mobile unit 5 and AP 10, thereby identifying both the user and his location to the network. Using this identification and location data, network 15 provides desired services (or arranges to provide desired services by accessing appropriate providers) and essential information to the user of the mobile unit 5. Based on the type of information required, network 15 may access one or more information providers 20 to provide the information or services to the user. One or more information providers 20 are coupled to network 15 in a ring-network configuration, a star-network configuration, or other type of connection known in the art.

Other query/response approaches to link the mobile unit 5 and AP 10 could also be employed within the scope of the invention. For example, AP 10 could scan its coverage area, thereby causing a mobile unit 5 in the area to generate a response using active or passive circuitry. Such a response could be either a simple presence indication causing the AP 10 to transmit a further inquiry message requesting the mobile unit's identification information. Alternatively, in response to an AP scan, the mobile unit 5 could transmit its identification data immediately. Since a mobile unit may be in an area serviced by an AP for some time, either the AP or the mobile unit could be configured to determine if any correspondence is necessary before engaging in further communication.

In a simplified configuration according to the invention, the mobile unit could be configured merely as a device to locate its user through the APs 10. In this case, a processor on the network 15 would then take the appropriate action, such as sending an E-mail to the user's car rental agency, upon detection of the user's presence by an AP.

Network 15 shown in FIG. 2 stores information in the MIB 25. MIB 25 is a mechanism, such as a memory, which allows the persistent storage of information needed by network 15 to operate. Examples of such information include a directory of all the elements (APs, mobile units, etc) in the network, the topology of the network, characteristics of individual network elements, characteristics of connection links, performance and trend statistics, and any information which is of interest in the operation of the network 15. For example, the MIB would store the precise longitude, latitude, altitude and other geographic information pinpointing the location of each AP 10. Alternatively, an access point can be located by its proximity to another known location. For example, an access point location may be defined as a particular hotel known to be a particular address or having known latitude and longitude coordinates. The extent of geographic area covered by an access point may be defined in the same ways.

In order to reduce message traffic over the network, all or part of MIB may be stored at one or more access points 10. In particular, static information which does not change, or changes relatively infrequently, can be stored in the AP 10. Thus, as shown in FIG. 1, AP 10 includes a memory 27 for storing at least a portion of the MIB. For example, memory 27 could store the location of the AP 10, the local map, local services and other information, such that routine requests for information from the mobile unit, such as "Where am I" requests need not be serviced over the network, leaving more resources for other message traffic.

By way of example and not limitation, service and information providers 20 may include car rental agencies, hotels, restaurants, airline reservation centers, banks, taxi services, bus and train reservation offices, printing services, on-line database services, message services, and E-mail providers, so that the user can receive messages. The system according to the invention may also provide the user access to updates on specific databases, such as a database maintained by the user's employer (e.g., a company rolodex) or the user's own personal databases and any other service which can be used in a remote manner.

Any of the service and information providers 20 may maintain in memory data files on members and subscribing merchants and have the ability to extract data from past transactions for each of the users to facilitate future plans. In this way, the service providers have available the information to learn the past habits and preferences of their subscribers and provide corresponding services for new transactions.

For example, upon learning that a business traveller is scheduling a trip to Austin, service and information providers 20 consider the previous trips by the traveller develop a suggested itinerary, and book travel, hotel, car and restaurant reservations. The information providers 20 acquire knowledge about the habits of the traveller over a period of time, store the information in a memory, and extrapolate information from past habits for probable future actions consistent with these past actions. For example, when arranging for a rental car, the information stored in the service provider's memory for a particular subscriber may indicate that the subscriber typically requests a four door intermediate size car. Referencing this information, the service provider would now reserve a similar vehicle, unless otherwise instructed by the mobile unit.

A system according to the invention also has processing and memory access to operate in an interactive or adaptable mode. For example, when the user of the mobile unit 5 arrives at the airport, his identity, as well as the fact that he is at the airport, is detected by AP 10 and transmitted to the network, for example using the beacon signal emitted from his mobile unit 5, as previously described. One or more service providers with access to transportation schedules, flight status information, hotel or automobile rental information, weather information, ground maps or other information desired by the user employs network 15 to send the user updated information about whether a connecting flight has been delayed, alternative routings, where to go to pick up a pre-specified rental car, directions to a preferred hotel and other types of information.

Since the location of the AP 10 communication with a mobile unit 5 is known precisely, service and information provider 20 can employ processors to provide only suitable information to the user and can track the user's last reported location. For example, since updated information can be sent to the mobile unit 5, based on the location of the mobile unit 5, information that is pertinent only to the fact that the user of the mobile unit 5 is at the airport need be sent back to the mobile unit 5 via the communication path between AP 10 and the mobile unit 5. Other information can be sent at other times.

For purposes of illustration, FIG. 1 shows one AP 10 and one service and information provider 20 connected to network 15. However, any number of such APs and service and information providers would typically be connected to network 15 to service any number of mobile units, the only limitations being physical ones, such as constraints on bandwidth.

In a variation of a system according to the invention, the mobile unit 5 initiates a request for information from the network 15. For example, the user of the mobile unit 5 finds the location of the nearest automatic teller machine (ATM) by entering the request into the mobile unit 5, which will be received by the nearest AP 10. AP 10 forwards this request for information to the network 15. Network 15 routes the request to a service and information provider who obtains the requested information transmits it back to mobile unit 5 through AP 10.

In another variation of a system according to the invention, network 15 is connected to other types of communications networks, such as a public switched telephone network (PSTN), whereby the user of the mobile unit 5 sends and receives information from/to the PSTN or other communication network through a service provider. The service provider would employ processors and other apparatus to convert protocols and data formats from those used on the network 15 to those compatible with the PSTN or other communication network. For example, the user may receive facsimile information from a PSTN connected to the network 15.

Another feature according to the invention is the ability to adjust time clocks in the mobile unit to display and generate schedules using the correct time in the time zone where the user is located. This feature could be accomplished by storing in the MIB a time zone identifying code for each access point and during communication between an access point and a mobile unit, notifying the mobile unit of the correct zone. Alternatively, the time zone information could be stored in the access point or the access point could be instructed to check with a time reference (e.g., Greenwich Mean Time) and calculate local time. Alternatively, the time zone could be determined for the longitude of the access point stored in the MIB. This determination could be made either by the information provider and transmitted as a time zone message to the mobile unit or could be determined in the mobile unit using the longitude information of the access point.

Still another feature according to the invention is the ability to provide customized messages based on the location of the active access point or on the user's profile. For example, a user accessing a network through an access point in a hotel may be provided information about promotions offered by that hotel or other affiliated hotels, airlines, car rental agencies or other providers of goods and services.

The apparatus and method according to the invention and many of its attendant advantages will be understood from the foregoing description and it will be apparent that various changes may be made in form, construction and arrangement of the parts thereof without departing from the spirit and scope of the invention or sacrificing all of its material advantages, the form described here being merely a preferred embodiment thereof.

What is claimed is:

1. A geographic-based advertising system, comprising:
    a mobile unit;
    a network;
    one or more providers coupled to said network; and
    a plurality of access points coupled to said network and arranged at known locations in a geographic region, wherein each of said plurality of access points is configured to detect said mobile unit, wherein, upon detection of said mobile unit by a first access point of said plurality of access points in proximity to said mobile unit, a known location of said first access point is transmitted to at least one provider;
        wherein the at least one provider provides advertising through said first access point to said mobile unit, wherein said advertising is based upon the known location of said first access point.

2. The geographic-based advertising system of claim 1, wherein said advertising comprises promotions related to goods or services;
    wherein said promotions are based upon the known location of said first access point.

3. The geographic-based advertising system of claim 2, wherein said first access point is located closely to a first provider of goods or services;
    wherein said promotions comprise promotions of said first provider of goods or services.

4. The geographic-based advertising system of claim 1, wherein said first access point is located closely to a first provider of goods or services;

wherein said advertising comprises advertising of said first provider of goods or services.

5. The geographic-based advertising system of claim 1, wherein the mobile unit comprises a portable computing device.

6. The geographic-based advertising system of claim 5, wherein the portable computing device is a personal digital assistant (PDA) device.

7. The geographic-based advertising system of claim 1, wherein the mobile unit comprises a portable computing device carried by a user; wherein the advertising is based upon the known location of said first access point and a profile of the user.

8. A method of providing geographic-based advertising, the method comprising:
   detecting the presence of a mobile unit in the vicinity of an access point, wherein said access point has a known geographic location, wherein the mobile unit comprises a portable computing device;
   transmitting advertising information to the mobile unit in response to said detecting, wherein the advertising information is dependent upon the known geographic location of the access point.

9. The method of claim 8, further comprising:
   selecting said advertising information based upon the known geographic location of the access point prior to said transmitting.

10. The method of claim 8, wherein said access point is located closely to a first provider of goods or services; wherein said advertising information comprises advertising of said first provider of goods or services.

11. The method of claim 8, wherein said advertising information comprises promotion information.

12. The method of claim 11, wherein said access point is located closely to a first provider of goods of services; wherein said promotion information comprise promotions of said first provider of goods or services.

13. The method of claim 8, wherein the portable computing device is a personal digital assistant (PDA) device.

14. The method of claim 8, wherein the portable computing device is carried by a user; wherein the advertising information is based upon the known location of said first access point and a profile of the user.

15. A method of providing geographic-based advertising, the method comprising:
   detecting the presence of a mobile unit in the vicinity of an access point, wherein said access point has a known geographic location;
   providing the known geographic location of said access point to a provider in response to said detecting; and
   the provider transmitting advertising information to the mobile unit, wherein the advertising information if dependent upon the known geographic location of the access point.

16. The method of claim 15, wherein the mobile unit comprises a portable computing device.

17. The method of claim 16, wherein the portable computing device is a personal digital assistant (PDA) device.

18. The method of claim 15, wherein the mobile unit comprises a portable computing device carried by a user; wherein the advertising information is based upon the known location of said first access point and a profile of the user.

19. A geographic-based advertising system, comprising:
   a plurality of access points operable to be coupled to a network and arranged at known locations in a geographic region, wherein each of the plurality of access points is configured to detect a portable computing device carried by a user, wherein, after detection of the portable computing device by a first access point of the plurality of access points in proximity to the portable computing device, the first access point transmits advertising information to the portable computing device, wherein the advertising information is dependent upon a known location of the first access point.

20. The geographic-based advertising system of claim 19, wherein said advertising comprises promotions related to goods or services; wherein said promotions are based upon the known location of said first access point.

21. The geographic-based advertising system of claim 20, wherein said first access point is located closely to a first provider of goods or services; wherein said promotions comprise promotions of said first provider of goods or services.

22. A geographic-based advertising system, comprising:
   an advertising provider operable to be coupled to a network to receive a known location of a mobile unit; wherein the advertising provider provides advertising information through the network to the mobile unit, wherein the advertising provider provides said advertising information dependent upon the known location of the mobile unit.

23. The geographic-based advertising system of claim 22, wherein the mobile unit comprises a portable computing device.

24. The geographic-based advertising system of claim 23, wherein the portable computing device is a personal digital assistant (PDA) device.

25. The geographic-based advertising system of claim 22, wherein the mobile unit comprises a portable computing device carried by a user; wherein the advertising provider provides said advertising information dependent upon the known location of the mobile unit and a profile of the user.

26. The geographic-based advertising system of claim 22, wherein the known location of the mobile unit comprises a known location of an access point communicating with the mobile unit.

27. The geographic-based advertising system of claim 22, wherein the mobile unit comprises a portable computing device carried by a user; wherein the known location of the portable computing device comprises a known location of an access point communicating with the portable computing device.

28. A method of providing geographic-based advertising in a geographic-based communication system, wherein the geographic-based communication system uses known locations of a plurality of network access points (APs) to service mobile users who are in a vicinity of the APs, the method comprising:

detecting a presence of a mobile unit in the vicinity of one of said APs;

providing a known location of said one of said APs to an advertising provider in response to said detecting;

receiving advertising information from the advertising provider, wherein the advertising information is dependent upon the know location of said one of said APs; and transmitting the advertising information to the mobile unit through said one of said APs.

29. The method of claim 28, wherein the mobile unit comprises a portable computing device.

30. The method of claim 29, wherein the portable computing device is a personal digital assistant (PDA) device.

31. The method of claim 28, wherein the mobile unit comprises a portable computing device carried by a user;

wherein the advertising information if dependent upon the known location of said one of said APs and a profile of the user.

32. A method of providing geographic-based advertising services using known locations of network access points (APs) to service mobile users who are in a vicinity of the APs, the method comprising:

receiving a known location of one of said APs in response to said one of said APs detecting a mobile unit;

selecting advertising information dependent upon the known location of said one of said APs; and transmitting the advertising information to the mobile unit through said one of said APs.

33. The method of claim 32, wherein the mobile unit comprises a portable computing device.

34. The method of claim 33, wherein the portable computing device is a personal digital assistant (PDA) device.

35. The method of claim 32, wherein the mobile unit comprises a portable computing device carried by a user;

wherein said selecting advertising information comprises selecting the advertising information dependent upon the known location of said one of said APs and a profile of the user.

36. A method of providing geographic-based advertising services to a user of a mobile unit, the method comprising:

receiving a known location of the mobile unit;

selecting advertising information dependent upon the known location of the mobile unit; and transmitting the advertising information to the mobile unit after said selecting.

37. The method of claim 36, wherein the mobile unit comprises a portable computing device.

38. The method of claim 37, wherein the portable computing device is a personal digital assistant (PDA) device.

39. The method of claim 36, wherein the mobile unit comprises a portable computing device carried by a user;

wherein said selecting advertising information comprises selecting the advertising information dependent upon the known location of the mobile unit and a profile of the user.

40. The method of claim 36, wherein the known location of the mobile unit comprises a known location of an access point communicating with the mobile unit.

41. The method of claim 36, wherein the mobile unit comprises a portable computing device;

wherein the known location of the portable computing device comprises a known location of an access point communicating with the portable computing device.

42. A geographic-based system, comprising:

a mobile unit;

a network;

one or more providers coupled to said network; and a plurality of access points coupled to said network and arranged at known locations in a geographic region, wherein each of said plurality of access points is configured to detect said mobile unit, wherein, upon detection of said mobile unit by a first access point of said plurality of access points in proximity to said mobile unit, a known location of said first access point is transmitted to at least one provider;

wherein the at least one provider provides a promotion through said first access point to said mobile unit, wherein said promotion is based upon the known location of said first access point.

43. The geographic-based system of claim 42, wherein said promotion comprises an advertisement related to goods or services;

wherein said advertisement is based upon the known location of said first access point.

44. The geographic-based system of claim 43, wherein said first access point is located closely to a first provider of goods or services;

wherein said advertisement comprises an advertisement of said first provider of good or services.

45. The geographic-based system of claim 42, wherein said first access point is located closely to a first provider of goods or services;

wherein said promotion comprises a promotion of said first provider of goods or services.

46. The geographic-based system of claim 42, wherein the mobile unit comprises a portable computing device.

47. The geographic-based system of claim 46, wherein the portable computing device is a personal digital assistant (PDA) device.

48. The geographic-based system of claim 42, wherein the mobile unit comprises a portable computing device carried by a user;

wherein said promotion is based upon the known location of said first access point and a profile of the user.

49. A geographic-based system, comprising:

a portable computing device carried by a user;

a network;

a one or more providers coupled to said network; and a plurality of access points coupled to said network and arranged at known locations in a geographic region, wherein each of said plurality of access points is configured to detect said portable computing device, wherein, upon detection of said portable computing device by a first access point of said plurality of access points in proximity to said portable computing device, a known location of said first access point is transmitted to at least one provider;

wherein the at least one provider provides a promotion through said first access point to said portable computing device, wherein said promotion is based upon the known location of said first access point.

50. The geographic-based system of claim 49, wherein said promotion comprises an advertisement related to goods or services;

wherein said advertisement is based upon the known location of said first access point.

51. The geographic-based system of claim 49, wherein said first access point is located closely to a first provider of goods or services;

wherein said promotion comprises a promotion of said first provider of goods or services.

52. The geographic-based system of claim 49, wherein said promotion is based upon the known location of said first access point and a profile of the user.

53. The geographic-based system of claim 49, wherein the portable computing device is a personal digital assistant (PDA) device.

54. A method of providing geographic-based promotions, the method comprising:

detecting the presence of a mobile unit in the vicinity of an access point, wherein said access point has a known geographic location, wherein the mobile unit comprises a portable computing device;

transmitting promotion information to the mobile unit in response to said detecting, wherein the promotion information is dependent upon the known geographic location of the access point.

55. The method of claim 54, further comprising:

selecting the promotion information based upon the known geographic location of the access point prior to said transmitting.

56. The method of claim 54, wherein the access point is located closely to a first provider of goods or services;

wherein the promotion information comprises a promotion of said first provider of goods or services.

57. The method of claim 54, wherein said promotion information comprises advertising information.

58. The method of claim 57, wherein said access point is located closely to a first provider of goods or services;

wherein said advertising information comprises an advertisement of said first provider of goods or services.

59. The method of claim 54, wherein the portable computing device is carried by a user;

the method further comprising:

selecting the promotion information based upon the known geographic location of the access point and a profile of the user prior to said transmitting.

60. The method of claim 54, wherein the portable computing device is a personal digital assistant (PDA) device.

61. A method of providing geographic-based promotions, the method comprising:

detecting the presence of a portable computing device in the vicinity of an access point, wherein said access point has a known geographic location, wherein the portable computing device is carried by a user;

transmitting promotion information to the portable computing device in response to said detecting, wherein the promotion information is dependent upon the known geographic location of the access point.

62. The method of claim 61, further comprising:

selecting the promotion information based upon the known geographic location of the access point prior to said transmitting.

63. The method of claim 61, wherein the access point is located closely to a first provider of goods or services;

wherein the promotion information comprises a promotion of said first provider of goods or services.

64. The method of claim 61, wherein said promotion information comprises advertising information.

65. The method of claim 64, wherein said access point is located closely to a first provider of goods or services;

wherein said advertising information comprises an advertisement of said first provider of goods or services.

66. The method of claim 61, the method further comprising:

selecting the promotion information based upon the known geographic location of the access point and a profile of the user.

67. The method of claim 61, wherein the portable computing device is a personal digital assistant (PDA) device.

68. A method of providing geographic-based promotions, the method comprising:

detecting the presence of a mobile unit in the vicinity of an access point, wherein the access point has a known geographic location;

providing the known geographic location of the access point to a provider after said detecting;

the provider transmitting promotion information to the mobile unit, wherein the promotion information is dependent upon the known geographic location of the access point.

69. The method of claim 68, further comprising:

the provider selecting said promotion information based upon the known geographic location of the access point prior to said transmitting.

70. The method of claim 68, wherein said access point is located closely to a first provider of goods or services;

wherein said promotion information comprises a promotion of said first provider of goods or services.

71. The method of claim 68, wherein said promotion information comprises advertising information.

72. The method of claim 68, wherein the mobile unit comprises a portable computing device.

73. The method of claim 72, wherein the portable computing device is a personal digital assistant (PDA) device.

74. The method of claim 68, wherein the mobile unit comprises a portable computing device that is carried by a user;

the method further comprising:

selecting the promotion information based upon the known geographic location of the access point and a profile of the user.

75. A method of providing geographic-based promotions, the method comprising:

detecting the presence of a portable computing device in the vicinity of an access point, wherein the access point has a known geographic location, wherein the portable computing device is carried by a user;

providing the know geographic location of the access point to a provider after said detecting;

the provider transmitting promotion information to the portable computing device, wherein the promotion information is dependent upon the known geographic location of the access point.

76. The method of claim 75, further comprising:

selecting said promotion information based upon the known geographic location of the access point prior to said transmitting.

77. The method of claim 75, further comprising:

the provider selecting said promotion information based upon the known geographic location of the access point prior to said transmitting.

78. The method of claim 75, wherein said access point is located closely to a first provider of goods or services;

wherein said promotion information comprises a promotion of said first provider of goods or services.

79. The method of claim 75, wherein said promotion information comprises advertising information.

80. The method of claim 75, wherein portable computing device comprises a personal digital assistant (PDA).

81. The method of claim 75, further comprising:

selecting the promotion information based upon the known geographic location of the access point and a profile of the user.

82. The method of claim 75, further comprising:

the provider selecting the promotion information based upon the known geographic location of the access point and a profile of the user.

83. A geographic-based system, comprising:

a plurality of access points operable to be coupled to a network and arranged at known locations in a geographic region, wherein each of the plurality of access points is configured to detect a portable computing device carried by a user, wherein, after detection of the portable computing device by a first access point of the plurality of access points in proximity to the portable computing device, the first access point transmits promotion information to the portable computing device, wherein the promotion information is dependent upon a known location of the first access point.

84. The geographic-based system of claim 83, wherein said promotion information comprises an advertisement related to goods or services;

wherein the advertisement is based upon the known location of said first access point.

85. The geographic-based system of claim 84, wherein said first access point is located closely to a first provider of goods or services;

wherein said promotion information comprises a promotion of said first provider of goods or services.

86. A geographic-based promotion system, comprising:

a promotion provider operable to be coupled to a network to receive a known location of a mobile unit;

wherein the promotion provider provides promotion information through the network to the mobile unit, wherein the promotion provider provides said promotion information dependent upon the known location of the mobile unit.

87. The geographic-based promotion system of claim 86, wherein the mobile unit comprises a portable computing device.

88. The geographic-based promotion system of claim 87, wherein the portable computing device is a personal digital assistant (PDA) device.

89. The geographic-based promotion system of claim 86, wherein the mobile unit comprises a portable computing device carried by a user;

wherein the promotion provider provides said promotion information dependent upon the known location of the mobile unit and a profile of the user.

90. The geographic-based promotion system of claim 86, wherein the known location of the mobile unit comprises a known location of an access point communicating with the mobile unit.

91. The geographic-based promotion system of claim 86, wherein the mobile unit comprises a portable computing device;

wherein the known location of the portable computing device comprises a known location of an access point communicating with the portable computing device.

92. A geographic-based promotion system, comprising:

a promotion provider operable to be coupled to a network to receive a known location of a portable computing device, wherein the portable computing device is carried by a user;

wherein the promotion provider provides promotion information through the network to the portable computing device, wherein the promotion provider provides said promotion information dependent upon the known location of the portable computing device.

93. A method of providing geographic-based promotions in a geographic-based communication system, wherein the geographic-based communication system uses known locations of a plurality of network access points (APs) to service mobile users who are in a vicinity of the APs, the method comprising:

detecting a presence of a mobile unit in the vicinity of one of said APs;

providing a known location of said one of said APs to a promotion provider in response to said detecting;

receiving promotion information from the promotion provider, wherein the promotion information is dependent upon the known location of said one of said APs; and transmitting the promotion information to the mobile unit through said one of said APs.

94. The method of claim 93, wherein the mobile unit comprises a portable computing device.

95. The method of claim 94, wherein the portable computing device is a personal digital assistant (PDA) device.

96. The method of claim 93, wherein the mobile unit comprises a portable computing device carried by a user;

wherein the promotion information is dependent upon the known location of said one of said APs and a profile of the user.

97. A method of providing geographic-based promotion services using known locations of network access points (APs) to service mobile users who are in a vicinity of the APs, the method comprising:

receiving a known location of one of said APs in response to said one of said APs detecting a mobile unit;

selecting promotion information dependent upon the known location of said one of said APs; and transmitting the promotion information to the mobile unit through said one of said APs.

98. The method of claim 97, wherein the mobile unit comprises a portable computing device.

99. The method of claim 98, wherein the portable computing device is a personal digital assistant (PDA) device.

100. The method of claim 97, wherein the mobile unit comprises a portable computing device carried by a user;

wherein said selecting promotion information comprises selecting the promotion information dependent upon the known location of said one of said APs and a profile of the user.

101. A method of providing geographic-based promotion services to a user of a mobile unit, the method comprising:

receiving a known location of the mobile unit;

selecting promotion information dependent upon the known location of the mobile unit; and transmitting the promotion information to the mobile unit after said selecting.

102. The method of claim 101, wherein the mobile unit comprises a portable computing device.

103. The method of claim 102, wherein the portable computing device is a personal digital assistant (PDA) device.

104. The method of claim 101, wherein the mobile unit comprises a portable computing device carried by a user;

wherein said selecting promotion information comprises selecting the promotion information dependent upon the known location of the mobile unit and a profile of the user.

105. The method of claim 101, wherein the known location of the mobile unit comprises a known location of an access point communicating with the mobile unit.

106. The method of claim 101, wherein the mobile unit comprises a portable computing device;

wherein the known location of the portable computing device comprises a known location of an access point communicating with the portable computing device.

107. A method of providing geographic-based promotion services to a user of a portable computing device, the method comprising:

receiving a known location of the portable computing device;

selecting promotion information dependent upon the known location of the portable computing device; and transmitting the promotion information to the portable computing device after said selecting.

108. The method of claim 107, wherein the portable computing device is a portable smart device.

* * * * *

UNITED STATES PATENT AND TRADEMARK OFFICE
CERTIFICATE OF CORRECTION

PATENT NO.     : 6,452,498 B1
DATED          : September 17, 2002
INVENTOR(S)    : Brett B. Stewart It is certified that error appears in the above-identified patent and that said Letters Patent is hereby corrected as shown below:

Column 11,
Line 7, please delete "know" and substitute -- known --.
Line 20, please delete "information if" and substitute -- information is --.

Column 15,
Line 3, please delete "know" and substitute -- known --.

Signed and Sealed this

Twenty-eighth Day of January, 2003

JAMES E. ROGAN
*Director of the United States Patent and Trademark Office*